Patented Aug. 15, 1944

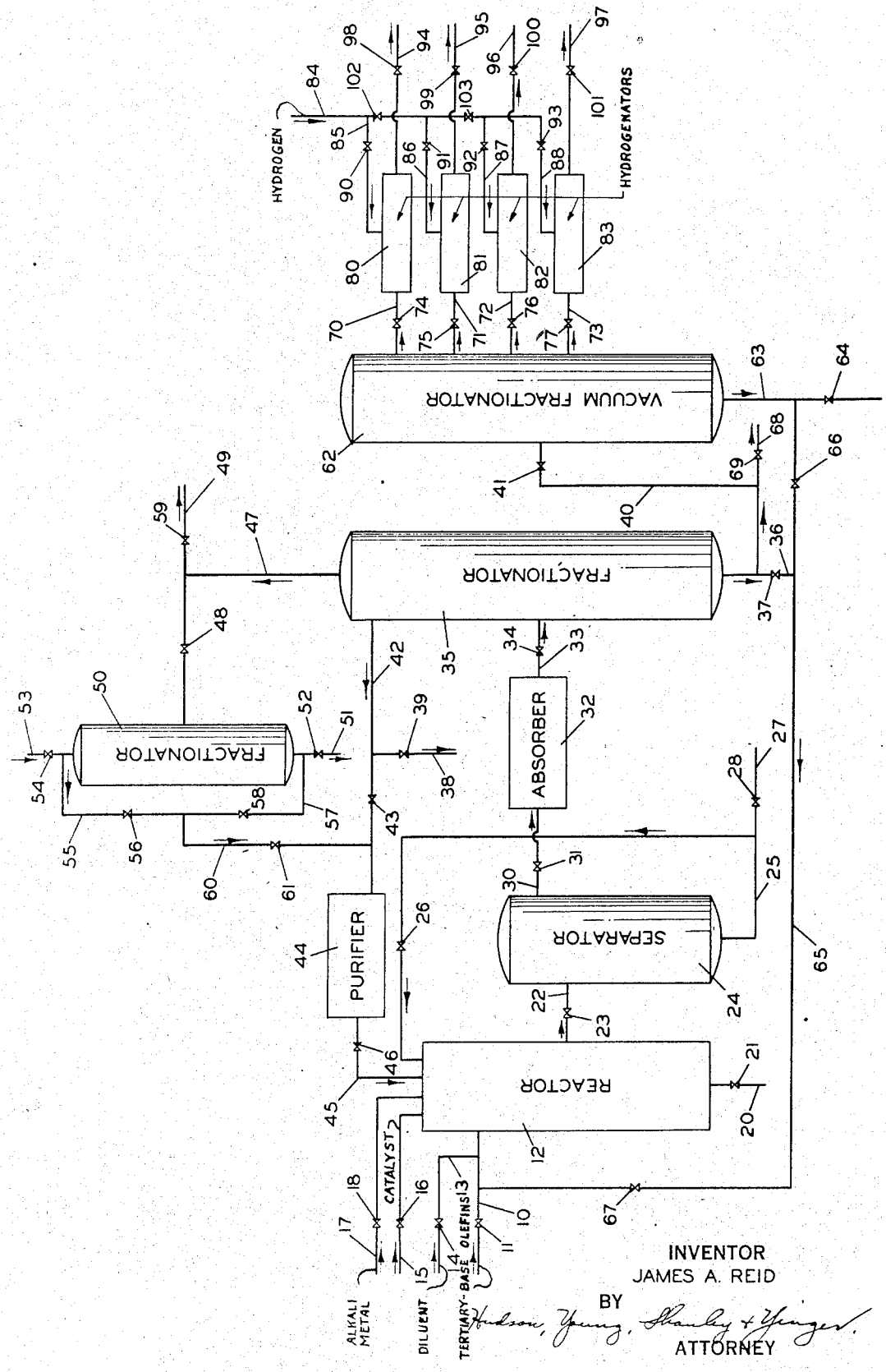

2,355,925

UNITED STATES PATENT OFFICE 2,355,925

POLYMERIZATION PROCESS

James A. Reid, Bartlesville, Okla., assignor to Phillips Petroleum Company, a corporation of Delaware Application July 14, 1941, Serial No. 402,415

18 Claims. (Cl. 260—683.15)

This invention relates to the catalytic conversion of olefins to hydrocarbons of higher molecular weight. More particularly it relates to the production from lower boiling olefins of lubricating oils and of lubricating oil stocks within desired viscosity ranges and of superior characteristics in the presence of an active metal halide and an alkali metal. More specifically, it relates to the polymerization of tertiary-base olefins to form lubricating oil stocks.

The catalytic polymerization of unsaturated aliphatic hydrocarbons, such as olefins or mixtures of them, to form compounds of higher molecular weight is well known. By using selected catalysts and conditions for the polymerization, it is possible from many individual olefins as well as from a variety of olefin-containing charge stocks to obtain products varying in characteristics from gasoline through the more viscous oils to resinous and rubber-like materials. In order to convert olefins to polymers in the viscosity range of lubricating oils, active metal halides, such as aluminum chloride, aluminum bromide, ferric chloride or bromide, zinc chloride, boron fluoride, zirconium chloride, and the like, are preferred catalysts, and are often called Friedel-Crafts type catalysts. Various iodides may also be used. The Friedel-Crafts type catalysts may be employed either alone or in conjunction with various organic or inorganic modifiers, promoters, solvents, and the like. In the production of polymers in the lubricant range, which may have molecular weights of about 250 to 1000, although higher or lower molecular weight products may be used in special applications, reaction temperatures in the range of 0 to 200° F. are normally employed, the viscosity and molecular weight of the product usually decreasing with increase in reaction temperature.

The materials that may be used as polymerization charge stocks include the lower molecular weight normally gaseous or liquid aliphatic olefins. In some cases other compounds, including diolefins such as butadiene, cyclopentadiene and the like, acetylene-type compounds, aromatic hydrocarbons, and even oxygen-, sulfur- or nitrogen-containing compounds may be converted with olefins in the polymerization reactions. Since the characteristics of the polymerization product are dependent in part upon the charge stocks, the composition of the olefin mixture charged to any particular polymerization system is accordingly controlled through adequate means so as to permit the production of desirable polymers. In many instances it is desirable to use as charge only a single olefin species, strictly purified to eliminate other possible reactant materials.

The olefins may be obtained in a relatively pure state by dehydration of the appropriate alcohols, dehydrogenation of the corresponding paraffins, depolymerization of more viscous polymers, or the like. On a commercial scale, the olefins are preferably manufactured by dehydrogenation of paraffin hydrocarbons. The low-boiling olefins such as propylene and isobutylene may be prepared by thermal treatment of paraffin hydrocarbons, as well as by catalytic dehydrogenation. Higher molecular weight olefins may be prepared either by thermal treatment of paraffins, resulting in the production of olefins most of which possess shorter carbon chains than the original paraffin, or by catalytic dehydrogenation of higher hydrocarbons with the formation of olefins having predominantly the same number of carbon atoms in the molecule as the original paraffins. Selected fractions of olefin-containing refinery products, such as the products from cracking stills, may also be used as charge stocks, especially after chemical treatment for the removal of objectionable components from the mixtures. Since the polymerization reaction is strongly exothermic it may be desirable to dilute the olefin with unreactive hydrocarbons in order to control the temperature and reaction rate more readily. Dilution may also be desirable to facilitate handling of the products.

Although it has previously been proposed to polymerize olefins in the presence of an active metal halide catalyst, together with a small amount of hydrogen halide, whereby in general a more rapid polymerization is obtained, in many cases the polymers so obtained, especially in the viscosity range of lubricating oils, are quite inferior in one or more important physical characteristics to polymers prepared from the same charge stock using the same metal halide catalyst under the same conditions but in the substantial absence of any hydrogen halide. This is particularly true when the olefins polymerized are tertiary-base olefins, or when tertiary-base olefins comprise an appreciable portion of an olefinic hydrocarbon material which is being polymerized. In particular it has been observed that the viscosity index of polymers in the viscosity range of lubricating oils produced by the polymerization of tertiary-base olefins or olefin mixtures containing tertiary-base olefins varies considerably with the amount of hydrogen halide present in the mixture during the polymerization. In view of the importance of such physical properties, these variations are important and generally they are of an undesirable nature when formed in the presence of a hydrogen halide.

By tertiary-base olefins I intend to include, in general, such olefins which correspond to the formula $R_2C=CR'_2$ where each R is any alkyl group and each R' is hydrogen or any alkyl group. Such olefins, upon hydrolysis in an acidic medium, will generally yield a tertiary alcohol.

Typical low-boiling tertiary-base olefins are 2-methyl-propene, 2-methyl-1-butene, 2-methyl-2-butene, 2-methyl-1-pentene, 2-methyl-2-pentene, 3-methyl-2-pentene, and the like.

In the absence of other contaminants I have found that the variation in quality of the polymeric oil produced by the conversion of an olefin in the presence of an active metal halide results primarily from the presence of a hydrogen halide in the system. Greater proportions of one or more hydrogen halides in such catalytic systems result in the production of low viscosity index products, other conditions remaining substantially the same. In such systems I have found that consistently uniform products of relatively high viscosity index are produced from tertiary-base olefins, or from mixtures containing tertiary-base olefins, only in the substantial absence of a hydrogen halide.

Hydrogen halides in the system may result from the addition of certain modifiers, either as a direct reaction product or as a product of reaction with metal halide catalyst, from the reaction with the catalyst of some oxygen or sulfur compounds, or the like, present in the charge such as water, mercaptans, alcohols, or the like, or from decomposition interaction of metal halide catalysts of the Friedel-Crafts type with a hydrocarbon in the system. Thus although the selection of a suitable catalyst and purification of materials charged to the system reduces the variation in product quality, the variations can not under most circumstances be eliminated by such means. I have now discovered that products of consistently desirable quality and uniformity can be produced through the use of a material in the polymerization zone which will remove any hydrogen halides from said zone.

An object of this invention is to produce improved lubricating oil stocks.

Another object of this invention is to convert olefins into desirable lubricating oils.

Another object of this invention is to polymerize tertiary-base olefins or olefin mixtures containing tertiary-base olefins to produce hydrocarbons in the viscosity range of lubricating oils having high viscosity index values.

A further object of this invention is to provide a superior catalytic system for the conversion of polymerizable olefins to polymers in the viscosity range of lubricating oils.

Still another object of this invention is to polymerize tertiary-base olefins to products of desirable quality and uniformity using a metal halide catalyst in a system substantially free from hydrogen halide.

Further objects and advantages of this invention will become apparent from the accompanying disclosure and discussion.

My invention comprises, more specifically, the use of an alkali metal in conjunction with, or associated with, an active metal halide of the Friedel-Crafts type, which does not react with the alkali metal under the conditions of use, for the reaction of tertiary-base olefins, or olefin mixtures containing tertiary-base olefins, at suitable temperature which will generally be found in the range of about 0 to 200° F., and a pressure in the range of atmospheric to 500 pounds per square inch gauge or adequate to maintain a substantial proportion of the reactants in liquid phase, to produce products in the lubricating oil viscosity range which possess higher viscosity index values, for example, than those produced in conventional catalytic systems. The reaction time, which depends greatly on the catalyst, the temperature, the reactants, the extent of conversion, etc., is usually in the range of ½ to 10 hours, although longer or shorter times may be employed in specific cases. For example, a reaction time in the lower part of the range is desirable for polymerization when the activity of the catalyst is high, when the temperature of the conversion is in the upper part of the temperature range, when the reactants are relatively easily polymerizable, and/or the extent of conversion is maintained at a low value. An alkali metal does not catalyze the polymerization of an appreciable quantity of olefin under the conditions of reaction herein disclosed nor does it affect the activity of the active metal halide catalyst to any appreciable extent.

As is more completely brought out elsewhere in this disclosure, it is believed that the primary function of the alkali metal which is associated with the active metal halide, or of other material which may be associated with the active metal halide in accordance with this disclosure, is to react with and remove from the polymerization zone hydrogen halide which may be present or formed. Whether or not this is the only function, or even the true function, is not conclusively known at this time, although it is believed to be one of the more important factors. The alkali metal, or other material, may have a promoting effect on the active metal halide, or inhibit its catalytic action in one direction while permitting it to be exerted, or promoting its action, in another direction. In connection with my invention it is convenient to speak of reacting unsaturated hydrocarbons, such as olefins, in the presence of a catalyst comprising an active metal halide, or a metal halide catalyst of the Friedel-Crafts type, associated with an alkali metal or, more broadly, associated with a material which inhibits the formation or continued existence of a hydrogen halide, and such use of the term catalyst in this specification and in the accompanying claims is made with this in mind. The catalyst of this invention can, in general, be applied to any hydrocarbon reaction ordinarily catalyzed by a Friedel-Crafts type metal halide. Thus it may be used in alkylation of saturated-type hydrocarbons with olefins, and in the simple polymerization of olefins. In many such reactions, however, the presence of a hydrogen halide is not deleterious, or markedly so, and some such reactions proceed only with extreme slowness in the virtual absence of a hydrogen halide from one source or another. For such reactions my catalyst will generally not be applied. However, as brought out in the present disclosure the use of my catalyst results in substantial improvements in the polymerization of tertiary-base olefins to form lubricating oil stocks, and this feature will be more particularly discussed in this disclosure.

It has been reported in the literature that under rigorously attained, anhydrous conditions there is no reaction between an alkali metal such as sodium and a hydrogen halide such as hydrogen chloride. In the use of my catalyst, comprising a Friedel-Crafts type metal halide and an alkali metal, or the like, for the polymerization of tertiary-base olefins to form lubricating oil stocks, products of higher quality result with well purified charge stocks, such purification including dehydration. However, it appears that the usual purification methods, even when a high purity is desired or obtained, are such that the beneficial actions of the alkali metal are not thereby appreciably inhibited or rendered ineffective.

An alkali metal, especially sodium or potassium, when added to a hydrocarbon mixture containing hydrogen halide removes such hydrogen halide very rapidly and completely, or as the case may be, takes it up as rapidly as it may be formed. Through adequate contact between alkali metal and the hydrocarbon phase, hydrogen halide in the system may thus be maintained at a very low value. To obtain intimate contact between the alkali metal and the other components in the system it is preferred that the metal be either very finely divided or in the liquid state. In most applications, the liquid alkali metal, such as sodium-potassium alloy or a solution of an alkali metal in another liquid metal such as mercury, is preferred to the finely divided solid to prevent coating of the liquid surface by alkali metal halide.

At relatively low temperatures, the alkali metals may be used satisfactorily in catalytic systems with any of the suitable metal halide catalysts. As the temperature is increased, however, some of those metal halides which may exist in a lower valence state may undergo reaction with the sodium or other alkali metal, thus bringing about a deactivation of the catalyst. For example, antimony pentachloride may be used satisfactorily with sodium only at very low reaction temperatures, since reduction to antimony trichloride occurs very readily. Thus, the more stable or less easily reduced metal halides, such as aluminum chloride, boron fluoride, zirconium chloride, and the like, may be used over a much wider range of operating conditions than the more readily reduced active metal halide catalysts such as antimony pentachloride, titanium tetrachloride and similar catalysts. At relatively high temperatures, usually in excess of 250° F., slow reaction of the alkali metal, especially sodium, with the olefin may occur; thus another limitation on the maximum conditions of reaction temperature and time in the system is imposed.

In these olefin polymerization systems, the active metal halide catalyst is normally used in a concentration of 0.5 to 10 per cent, depending upon the reactivity of the charge, the catalyst activity, the temperature level, the degree of agitation, etc. The proportion of alkali metal used is determined by the rate of evolution of hydrogen halide in the reaction system, and by the effectiveness of the contact between the alkali metal and the conversion system. In most batch polymerizations, it has been found desirable to use from 25 to 100 per cent by weight as much alkali metal as active metal halide catalyst. A great proportion of the alkali metal is recovered unchanged from the system, however, so that a relatively small proportion of alkali metal is normally consumed through reaction with hydrogen halide. The large excess of sodium or other alkali metal is desirable to facilitate removal of the hydrogen halide from the system. In a continuous polymerization system, it is desirable to use a relatively high proportion of both active metal halide catalyst and alkali metal to facilitate the reaction, since the excess catalyst may be retained in the system for prolonged use.

Besides the alkali metals, other materials may at times be employed in the polymerization to maintain the hydrogen halide concentration at a very low value. Such materials include the alkaline earth metals, oxides of the alkali and alkaline earth metals, and other compounds which react with hydrogen halide under the polymerization conditions but which do not deactivate the active metal halide catalysts. Sometimes highly adsorptive materials, such as activated charcoal, silica gel, alumina, or the like may also be used, when their nature and extent of use is such as to include the function of removal of hydrogen halide. However, the alkali metals are the most satisfactory from the viewpoint of the quality of the hydrocarbon products.

The polymerization is preferably conducted at a sufficiently high pressure that at the operating temperature a substantial concentration of the reactive olefin is maintained in the liquid reactant mixture. Through adequate agitation satisfactory contact of the reactants is established and control of the reaction temperature through removal of the exothermic heat of reaction is facilitated.

It has been previously found that straight chain 1-olefins are polymerized at a very low rate by some active metal halide catalysts in the absence of hydrogen halide, whereas the polymerization is greatly augmented by the presence of hydrogen halide in the polymerization system without deleterious effect on the quality of the product. Through a combination of those observations with the teachings of this invention, several advantageous polymerization processes may be followed in applying the invention. For example, the iso-olefins in a mixture of iso- and normal olefins may be selectively polymerized in a catalytic system containing a suitable active metal halide and alkali metal catalyst under such conditions that the iso-olefins are converted in substantial proportion to polymers in the viscosity range of lubricating oils which possess as high viscosity indexes as can be prepared from those reactants using active metal halide catalysts. The less reactive olefins which remain as unreacted charge may be separated from the polymer and converted in a catalyst system employing an active metal halide with a modifier such as hydrogen chloride, as in the application Serial No. 397,472, filed June 10, 1941, of which I am a coinventor. In such a combination of processes, products of higher viscosity index are produced than can be secured from a single conversion operation, and segregation of product types is achieved. For example, the polymer from the less reactive olefins normally possesses a higher thermal stability than the polymer from the iso-olefins.

The olefin polymers produced in the catalytic system herein disclosed may be used in the production of organic chemicals, resins, plastics, etc., in addition to possible use in the preparation of lubricating oils. For use in lubricating oil preparation, it is usually desirable to stabilize the olefin polymer toward oxidation through non-destructive hydrogenation or through alkylation to produce a saturated product. It may further be desirable to compound the synthetic oil with natural oils and/or with suitable additives to enhance such properties as oxidation resistance, film strength, dispersing action, and the like.

My invention will now be illustrated in connection with the accompanying drawing which shows diagrammatically one arrangement of apparatus by means of which my invention may be practiced in connection with the polymerization of olefins.

A hydrocarbon charge stock containing polymerizable olefins is introduced to the system through conduit 10 controlled by valve 11 and is passed to reactor 12 wherein olefins are converted to polymeric material. If this charge stock contains only a small amount of unreactive material it may at times be desirable to add unreactive diluents to the reaction zone. Such diluents may be mixed with the incoming charge stock by passing them to conduit 10 through conduit 13 controlled by valve 14 or may be passed directly to the reaction zone by other means not shown. Such diluents aid in the control of the subsequent polymerization and facilitate the handling of the resulting polymer. Catalyst for the polymerization reaction, such as an active metal halide, is charged to reactor 12 through conduit 15 controlled by valve 16. The catalyst is preferably mixed with an inert diluent, such as a paraffin hydrocarbon, before passing it to the reaction zone. This facilitates handling of the catalyst as well as providing an additional means for adding diluent material to the zone. Alkali metal is introduced to reactor 12 through conduit 17 controlled by valve 18, or may be introduced with the metal halide through conduit 15. The alkali metal may be introduced to the reactor in any convenient form, and even though it may be in the liquid state at the temperature of the reactor, it may be desirable to introduce it as a finely divided solid suspended in an inert hydrocarbon. The polymerization is conducted under conditions suitable to produce polymers suitable for use as lubricating oil stocks, as discussed herein. The reactor 12 may, if necessary, constitute more than one chamber for carrying out the reaction together with appropriate heaters, coolers, stirrers and the like known to the art, and may be operated batchwise or continuously. Polymerization effluent can then be passed through conduit 22 controlled by valve 23 to separator 24 in which any catalytic material, alkali metal and other non-hydrocarbon material may be separated from polymeric hydrocarbon material. When desirable, polymerization effluent can be removed from the system from reactor 12 through conduit 20 controlled by valve 21. However, it is generally preferable to pass the reaction mixture to separator 24. Separation of solid material in separator 24, both catalytic and non-catalytic, may be accomplished by settling, filtering, centrifuging or some other suitable means. When the activity of the catalyst is still high, having been but slightly decreased by the previous polymerization reaction, it may be recycled to the reactor 12 through conduit 25 controlled by valve 26 together with any alkali metal contained therewith. When, however, it is desirable to remove spent catalyst from the system for subsequent regeneration or other treatment, this may be done by means of conduit 27 controlled by valve 28. When such a procedure is followed, alkali metal is separated from spent catalyst in means not shown and then returned to the reactor 12 for removal of additional quantities of hydrogen halide.

Since all traces of catalyst and alkali metal are not usually removed by mechanical separation, it is desirable to pass the polymerization effluent, still containing residual solid material, through conduit 30 controlled by valve 31 to absorber 32 in which all traces of catalytic and other solid material are removed. This may be accomplished, for example, by treating with adsorbent clay, washing with dilute alkali, or the like. The purified product of polymerization is then passed through conduit 33 controlled by valve 34 to fractionator 35. When its use is not necessary, the absorber 32 may be bypassed by means not shown, or left completely out of the system. Material charged to the fractionator which is polymeric in nature but not of high enough molecular weight nor of suitable viscosity to be included in a lubricating oil stock is removed from the fractionator through conduit 42 controlled by valve 43 and then through purifier 44 to remove any undesirable products such as compounds containing oxygen or halogen that have been formed or segregated in the fractionator. Such polymeric material substantially free from undesirable compounds is passed through conduit 45 controlled by valve 46 back to the reactor 12 therein to be subjected to further polymerization. Any desired portion or all of such material may be removed from the system through conduit 38 and valve 39. Material lighter than that passed through conduit 42 and containing a substantial portion of unreacted charge stock and diluent material passes through conduit 47 controlled by valve 48 to an auxiliary fractionator 50. In fractionator 50 the charge may be separated into a light and a heavy fraction which may be removed from the process through conduits 53 and/or 51, respectively, controlled by valves 54 and 52, respectively. When it is desirable, however, to retain at least a part of this material in the process either one or both fractions may be admixed with the stream in conduit 42 through conduit 60 controlled by valve 61 by proper manipulation of valves 56 and 58 in conduits 55 and 57, respectively, and valves 54 and 52 in conduits 53 and 51, respectively. When a portion of the material passing through conduit 47 may be recycled directly to the reactor, this may be accomplished by reintroducing to the reactor material removed through conduit 49 controlled by valve 59. The non-volatilized material in fractionator 35 contains polymers in the viscosity range of lubricating oils, and may be recovered through conduit 40 and conduit 68 controlled by valve 69, but generally this material is passed through conduit 40 controlled by valve 41 to vacuum fractionator 62. In the vacuum fractionator the polymers are separated into a series of fractions of different viscosities and removed from said fractionator through one or more conduits 70, 71, 72, and 73 controlled by valves 74, 75, 76 and 77, respectively. Each of these fractions are subjected to subsequent treatment, such as catalytic hydrogenation in reactors 30, 81, 82, and 83. Hydrogen for this reaction enters the system through conduit 84 and is passed at any desirable pressure and flow rate to hydrogenators 80, 81, 82, and 83 by proper control of valves 90, 91, 92, and 93 in conduits 85, 86, 87, and 88, respectively, and valves 102 and 103 in conduit 84. Hydrogenated polymer fractions in the viscosity range of lubricating oil are removed from the hydrogenators through conduits 94, 95, 96, and 97 controlled by valves 98, 99, 100, and 101, respectively and passed to equipment not shown where they may be stored, or blended and compounded to make finished oils. The hydrogenation reaction is readily accomplished at temperatures of about 300–550° F. and 200 to 3000 pounds per square inch hydrogen pressure using a catalyst such as reduced nickel on kieselguhr. The residue from fractionator 62 is removed through conduit 63 controlled by valve 64 either to be rejected or for further processing not shown. When desired, however, at least a part or all of the fraction may be passed through conduit 65 controlled by valves 66 and 67 to the incoming charge stock in conduit 10. Similarly, a part of the polymeric material removed from fractionator 35 through conduit 40 may be passed into conduit 65 through conduit 36 controlled by valve 37 for further processing in reactor 12 before being subjected to the hydrogenation step. Any of the lower boiling fractions from fractionator 62 may also be recycled to the reactor, by means not shown.

It is to be appreciated that the drawing just described is diagrammatic only. The various pieces of equipment illustrated and discussed are conventional in nature and in any application of our invention there will be associated with the individual units shown various pumps, heaters, coolers, reflux accumulators, heat exchangers, fractionating columns, temperature indicating and control devices, and the like known in the art and which may be suitably supplied for any particular case by one skilled in the art following the teachings of the reaction conditions and material flows disclosed and discussed herein.

My invention will be further illustrated by the following specific examples, which show various advantages of the invention but which are not necessarily to be construed as limiting the invention.

EXAMPLE I

A charge stock containing 87.8 per cent isobutylene, 2.6 per cent propylene plus normal butene, and the remaining per cent isobutane, was polymerized in a pressure autoclave using zirconium tetrachloride catalyst. The temperature was kept at 153° F., and the pressure was the vapor pressure of the hydrocarbon mixture. Adequate stirring was provided; the reaction was substantially complete after five hours. No unusual effort was made to keep the system free from hydrogen halide during this polymerization period. Approximately twenty per cent of the polymer product was in the viscosity range of lubricating oils. Properties of fractions in this range are given in Table I.

Table I

| Fraction | Viscosity at 210° F. S. U. V. | Viscosity index |
|---|---|---|
| 8 | 43.0 | 78 |
| 9 | 46.4 | 72 |
| 10 | 52.5 | 67 |
| 11 | 60.5 | 65 |
| 12 | 72.5 | 64 |
| 13 | 78.3 | 66 |

EXAMPLE II

The run cited in Example I was repeated except that a number of thin slices of clean sodium metal were placed in the reactor. About 18 per cent of the polymer product was in the viscosity range of lubricating oils. Properties of fractions in this range are given in Table II.

Table II

| Fraction | Viscosity at 210° F. S. U. V. | Viscosity index |
|---|---|---|
| 7 | 38.2 | 93 |
| 8 | 42.4 | 80 |
| 9 | 53.0 | 71 |
| 10 | 58.3 | 72 |

The viscosity index of the oil fractions obtained from this run were consistently higher than the viscosity indexes of similar oil fractions obtained from the run cited in Example I. This improvement in viscosity index has been obtained through the use of sodium metal to keep the polymerization system substantially free from hydrogen halide during the polymerization.

EXAMPLE III

The run cited in Example I was repeated except that a small amount of hydrogen chloride was added intermittently during the reaction period. The polymer product contained about 18 per cent of material in the viscosity range of lubricating oils, these oil fractions possessing viscosity indexes ranging from 15 to 35 as follows.

Table III

| Fraction | Viscosity at 210° F. S. U. V. | Viscosity index |
|---|---|---|
| 9 | 35.2 | 35 |
| 10 | 47.6 | 24 |
| 11 | 56.0 | 15 |
| 12 | 65.7 | 18 |

This run demonstrated the lowering of the viscosity index of the oily polymer caused by the presence of appreciable amounts of hydrogen chloride.

EXAMPLE IV

Sodium-potassium alloy was prepared by heating one part sodium and two parts potassium under an inert hydrocarbon to a temperature of about 210° F. Two parts of this alloy was placed in a glass reaction flask equipped with a motor driven stirrer and containing about 100 parts of paraffin hydrocarbon. This sodium-potassium alloy was liquid at room temperature. One part aluminum chloride was added to the reaction flask. While stirring continuously, the temperature of the flask was increased to 220° F. The flask was held at this temperature and four additional parts of aluminum chloride was added. There was no evidence of reaction between the sodium-potassium alloy and the aluminum chloride. The flask and its contents were allowed to cool to room temperature. The system was found to be highly active for the polymerization of various iso-olefin mixtures. This run showed that aluminum chloride catalyst is not deactivated by sodium or potassium metal in this temperature range.

I claim:

1. In a process for the production of hydrocarbons in the viscosity range of lubricating oils from low-boiling olefin hydrocarbons, the improvement which comprises subjecting a charge stock consisting of hydrocarbon material containing such olefin hydrocarbons to reaction under olefin polymerization conditions in the presence of an active metal halide catalyst associated with an alkali metal, the latter being sufficient to react with all hydrogen halide and other impurities which have an adverse influence on the character of the polymers formed and being essentially unreactive as an olefin polymerizing catalyst under the reaction conditions.

2. A process for the production of hydrocarbons in the viscosity range of lubricating oils and having relatively high viscosity indexes, which comprises polymerizing a tertiary-base olefin in the presence of a Friedel-Crafts type catalyst associated with an alkali metal to form polymers in the lubricating oil range, said alkali metal being essentially unreactive as an olefin polymerizing catalyst under said conditions and being sufficient to react with all hydrogen halide and other impurities which have an adverse influence on the character of the polymers formed, and said Friedel-Crafts type catalyst being substantially unreactive with said alkali metal under the polymerizing conditions, and subsequently separating the hydrocarbons in the viscosity range of lubricating oils so produced.

3. A process according to claim 1 in which the alkali metal is sodium.

4. A process according to claim 2 in which the alkali metal is sodium.

5. A process for producing hydrocarbon oils which comprises, polymerizing tertiary-base olefins at a polymerization temperature not greater than 200° F. in the presence of an active metal halide of the Friedel-Crafts type associated with an alkali metal to form polymers in the lubricating oil range, said alkali metal being essentially unreactive as an olefin polymerizing catalyst under said conditions and being sufficient to react with all hydrogen halide and other impurities which have an adverse influence on the character of the polymers formed, and the metal halide being nonreactive with the alkali metal under the conditions of polymerization.

6. A process for polymerizing low-boiling, tertiary-base olefins, which comprises polymerizing such an olefin at a polymerization temperature not greater than 200° F. in the presence of a catalyst comprising an active metal halide of the Friedel-Crafts type associated with an alkali metal to form polymers in the lubricating oil range, said alkali metal being sufficient to react with all hydrogen halide and other impurities which have an adverse influence on the character of the polymers formed and being essentially unreactive as an olefin polymerizing catalyst under the reaction conditions.

7. A process for polymerizing a low-boiling, tertiary-base olefin, which comprises polymerizing said olefin at a polymerization temperature not greater than 200° F. in the presence of a catalyst comprising aluminum chloride associated with an alkali metal to form polymers in the lubricating oil range, said alkali metal being sufficient to react with all hydrogen halide and other impurities which have an adverse influence on the character of the polymers formed and being essentially unreactive as an olefin polymerizing catalyst under the reaction conditions.

8. A process for polymerizing a low-boiling, tertiary-base olefin, which comprises polymerizing said olefin at a polymerization temperature not greater than 200° F. in the presence of a catalyst comprising zirconium tetrachloride associated with an alkali metal to form polymers in the lubricating oil range, said alkali metal being sufficient to react with all hydrogen halide and other impurities which have an adverse influence on the character of the polymers formed and being essentially unreactive as an olefin polymerizing catalyst under the reaction conditions.

9. A process for polymerizing a low-boiling, tertiary-base olefin, which comprises polymerizing said olefin at a polymerization temperature not greater than 200° F. in the presence of a catalyst comprising aluminum chloride associated with sodium to form polymers in the lubricating oil range, said sodium being sufficient to react with all hydrogen halide and other impurities which have an adverse influence on the character of the polymers formed and being essentially unreactive as an olefin polymerizing catalyst under the reaction conditions.

10. A process for polymerizing a low-boiling, tertiary-base olefin, which comprises polymerizing said olefin at a polymerization temperature not greater than 200° F. in the presence of a catalyst comprising zirconium tetrachloride associated with sodium to form polymers in the lubricating oil range, said sodium being sufficient to react with all hydrogen halide and other impurities which have an adverse influence on the character of the polymers formed and being essentially unreactive as an olefin polymerizing catalyst under the reaction conditions.

11. A process for polymerizing olefins, which comprises polymerizing a low boiling tertiary-base olefin in liquid phase at a temperature between 0 and 200° F. in the presence of a metal halide catalyst of the Friedel-Crafts type associated with an alkali metal, said alkali metal being in a liquid state and sufficient to react with all hydrogen halide and other impurities which have an adverse influence on the character of the polymers formed and being essentially unreactive as an olefin polymerizing catalyst under the reaction conditions.

12. A process for polymerizing olefins, which comprises polymerizing a low-boiling tertiary-base olefin in liquid phase at a temperature between 0 and 200° F. in the presence of aluminum chloride associated with an alkali metal, said alkali metal being in a liquid state and sufficient to react with all hydrogen halide and other impurities which have an adverse influence on the character of the polymers formed and being essentially unreactive as an olefin polymerizing catalyst under the reaction conditions.

13. A process for polymerizing olefins, which comprises polymerizing a low-boiling tertiary-base olefin in liquid phase at a polymerization temperature not greater than 200° F. in the presence of a metal halide catalyst of the Friedel-Crafts type associated with an alkali metal, said alkali metal being sufficient to react with all hydrogen halide and other impurities which have an adverse influence on the character of the polymers formed and being essentially unreactive as an olefin polymerizing catalyst under the reaction conditions.

14. A process for polymerizing olefins, which comprises polymerizing a low-boiling tertiary-base olefin in liquid phase at a polymerization temperature not greater than 200° F. in the presence of aluminum chloride associated with an alkali metal, said alkali metal being sufficient to react with all hydrogen halide and other impurities which have an adverse influence on the character of the polymers formed and being essentially unreactive as an olefin polymerizing catalyst under the reaction conditions.

15. A process for polymerizing isobutylene, which comprises polymerizing isobutylene in liquid phase at a polymerization temperature not greater than 200° F. in the presence of a metal halide catalyst of the Friedel-Crafts type associated with an alkali metal, said alkali metal being sufficient to react with all hydrogen halide and other impurities which have an adverse influence on the character of the polymers formed and being essentially unreactive as an olefin polymerizing catalyst under the reaction conditions.

16. A process for polymerizing olefins, which comprises subjecting a charge stock consisting of hydrocarbon material comprising a low-boiling olefin to polymerization conditions in liquid phase at a polymerization temperature not greater than 200° F. in the presence of a metal halide catalyst of the Friedel-Crafts type associated with an alkali metal, said alkali metal being sufficient to react with all hydrogen halide and other impurities which have an adverse influence on the character of the polymers formed and being essentially unreactive as an olefin polymerizing catalyst under the reaction conditions.

17. The process of claim 16, in which said metal halide is aluminum chloride and said alkali metal is sodium.

18. The process of claim 16 in which said low-boiling olefin is a tertiary-base olefin.

JAMES A. REID.